Oct. 2, 1934.
T. W. PAUL
1,975,237
HITCH DEVICE
Filed July 29, 1932
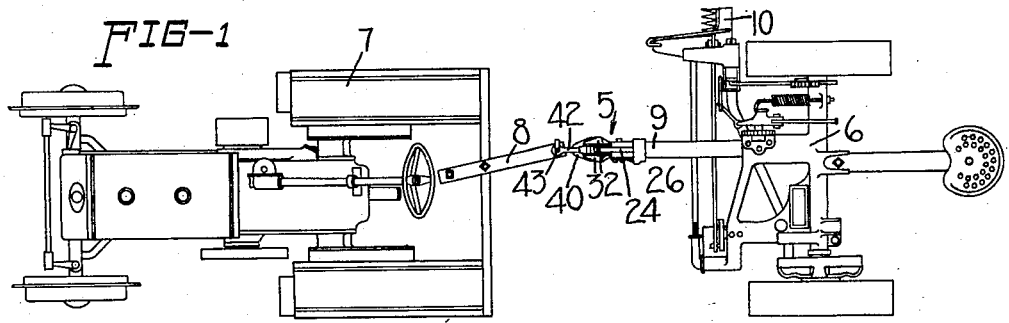
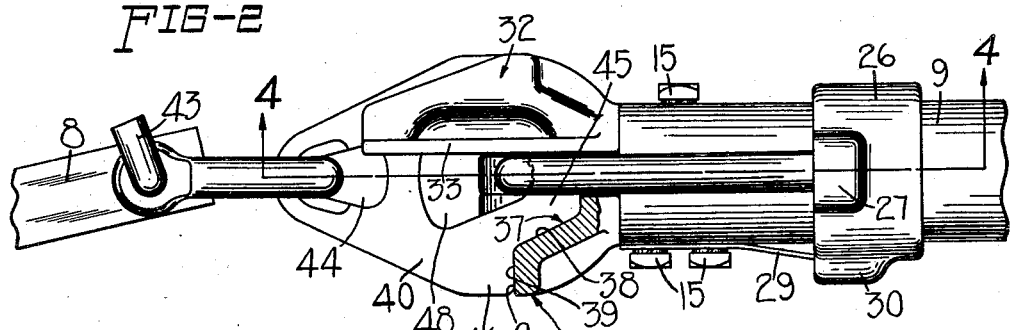
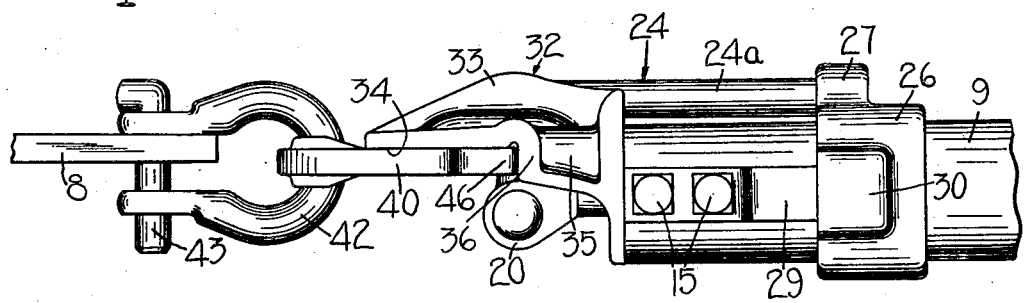
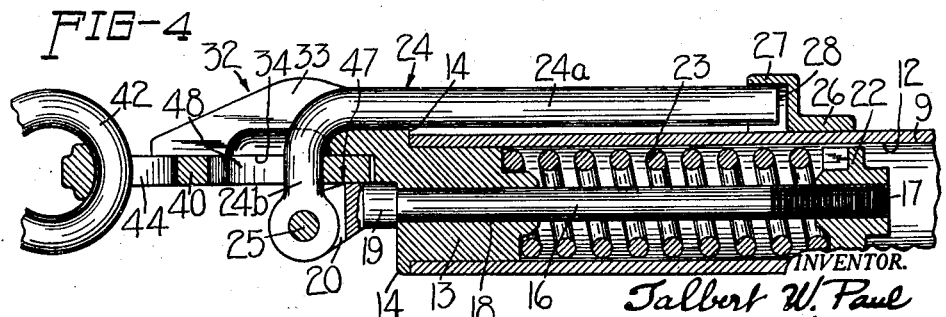
INVENTOR.
Talbert W. Paul
BY Brown, Jackson,
Boettcher & Dienner
ATTORNEYS.

Patented Oct. 2, 1934

1,975,237

UNITED STATES PATENT OFFICE 1,975,237

HITCH DEVICE

Talbert W. Paul, Kansas City, Kans., assignor to Deere & Company, Moline, Ill., a corporation of Illinois Application July 29, 1932, Serial No. 626,121

19 Claims. (Cl. 280—33.16)

This invention relates to a new and improved form of hitch device and is more particularly concerned with a hitch device that is automatically releasable. Moreover, the hitch device of the present invention is more particularly applicable for connection between a pair of implements or vehicles of which the trailing implement or vehicle is drawn in offset relation behind the pulling implement or vehicle or is otherwise subject to side draft or eccentric loads.

Releasable hitch devices of various types are now in existence and are being utilized for releasably connecting a pair of implements or other vehicles, but such prior hitch devices have all been primarily devised or, at least, are principally advantageous only for connecting implements or vehicles which are to be drawn with the trailing implement or vehicle directly aligned with the pulling implement or vehicle. Obviously, when such devices are so used all overload forces are directly transmitted to the draft tongue of the trailing vehicle and consequently to the hitch device whenever the trailing vehicle strikes an obstruction or is otherwise retarded. When such overload forces act substantially along the line of draft and directly rearwardly upon a releasable hitch device as of the prior art, generally no difficulty is experienced. However, these hitch devices have not proven entirely satisfactory when being employed between a pair of implements or vehicles that are connected with the trailing implement or vehicle offset with respect to the pulling implement or vehicle, and also, in such instances wherein the trailing implement or vehicle is directly aligned with the pulling implement or vehicle but wherein the draft tongue of the trailing vehicle and the hitch device are being subjected to considerable lateral forces because of the particular nature and use of the trailing implement or vehicle. Whenever these heretofore existent hitch devices are being employed to releasably connect implements or vehicles wherein lateral overload forces are imparted to the draft tongue of the trailing vehicle, the movable elements of those hitch devices invariably bind so as to be frictionally locked against freedom of movement and consequently they fail to release the trailing vehicle when the overload for which they were devised has been reached or exceeded, thereby entirely destroying their true function and thereby making it possible for detrimental and damaging results to occur.

Therefore, one of the main objects of the present invention is to provide a hitch device for releasably connecting a pair of implements or vehicles and which will positively release the trailing implement or vehicle from the pulling implement or vehicle under all adverse conditions no matter in what direction overload forces are imparted to the device from the trailing vehicle or its draft tongue. Obviously, however, the hitch device of the present invention is not limited in its use for connecting any particular types of vehicles nor is it limited for use in any specified arrangement of the vehicles with respect to each other.

Another of the objects of the present invention is to provide a hitch device which will positively function to release a trailing implement or vehicle from a pulling implement or vehicle regardless of the angular position of the trailing implement or vehicle relative to the pulling implement or vehicle.

A further object is to provide a hitch device to function in the capacity defined which is constructed of comparatively few and durable parts that are conveniently assembled and readily replaceable.

Further objects and advantages of the hitch device of the present construction will hereinafter appear in the following detailed description of a preferred embodiment thereof, reference being had to the accompanying drawing illustrating a preferred embodiment thereof.

In the drawing:

Figure 1 is a plan view of the preferred construction of my hitch device illustrating the same as operatively connecting a pair of implements;

Figure 2 is an enlarged plan view of the hitch device partially broken away and in section;

Figure 3 is a side elevational view of said device; and

Figure 4 is a longitudinal cross sectional view taken substantially along the plane of line 4—4 in Figure 2 and looking in the direction of the arrows.

In Figure 1 the hitch device is indicated by the reference numeral 5 and has been illustrated by way of example as releasably connecting a mower 6 with a tractor 7. In this instance, the tractor is provided with a draw bar 8 suitably connected therewith so as to draw the draft tongue 9 of the mower 6 in offset relation to the tractor 7 by means of the hitch device 5. The implements are arranged in this manner to allow the tractor to travel over grain-cut ground and to dispose the cutter bar 10 of the mower in a position where it will cut another swath from the standing grain. By using a mower as the trailing implement, as in the illustration in Figure 1, the utility of the present hitch device may be well demonstrated in view of the fact that when the cutter bar of a mower strikes an obstruction the pull due to the obstruction is transmitted to the tongue of the mower, not as an increased load directly in line with the tongue thereof, but rather as a bending stress tending to bend the tongue of the mower laterally. Such lateral bending stresses imparted to the draft tongue 9 of the mower will naturally be directly imparted to the hitch device 5, the particular action of the latter under those circumstances being fully explained in the following description of the hitch device.

Referring now to Figures 2, 3, and 4, it is to be noted that the mower tongue 9 is of hollow construction for conveniently receiving the resilient mechanism of the hitch device and for housing the same therein to protect that mechanism from injury and exposure to the elements. The central longitudinal bore 12 of the draft tongue 9 is closed at the forward outer end by means of a cylindrical abutment block or head 13. This abutment block or head 13 is preferably provided with a shoulder or flange 14 for engaging the outer end portion of the tongue, the block being held within the bore of the tongue by means of bolts 15, or other suitable means, which are threaded through the tongue 9 and into the abutment block or head 13.

The majority of the parts of my improved spring release hitch device are carried by the cylindrical block or head 13 so that the removal of the block from the tongue 9 through removal of bolts 15, effects the removal of the entire spring release unit from said tongue. A slidable and rotatable member preferably in the form of a draft bolt 16 is provided with an inner threaded end 17 and is disposed longitudinally through a central opening 18 in the abutment block 13. The draft bolt 16 includes, at its forward end, a head or other suitable abutment member 19 which abuts against the exterior end of a block or head 13 to limit the inward movement of the draft bolt 16.

The head or abutment member 19 of the present structure comprises a bifurcated or forked means having a pair of spaced ears 20 forming a portion of the abutment member, the ears functioning for a purpose hereinafter to be explained. The threaded end 17 of the draft bolt 16 receives suitably threaded abutment means such as the nut 22. A compression spring 23 encircles the draft bolt 16 and is biased between block 13 and the nut 22, the function of the spring being to maintain the head or abutment member 19 of the draft bolt 16 in abutting engagement with block 13 in the manner best illustrated in Figure 4.

An arm or hitch member 24 is pivotally carried by the draft bolt 16 for movement therewith by means of a pin or shaft 25 supported by means of the ears 20 of the abutment member 19. The arm or hitch member 24 is preferably formed as an L-shaped member having a leg 24a thereof extending horizontally in the longitudinal direction of the draft tongue 9 and another leg 24b thereof extending vertically from the pivotal support of member 24 and being adapted for receiving hitch means of the pulling implement.

A peripheral collar or sleeve 26 is slidably mounted upon and encircles the tubular draft member 9. This collar includes a raised portion or boss 27 which forms a pocket 28 for receiving the free end of the leg 24a of the hitch member 24 and acts as a means for holding the hitch member in its normal operative position under normal operating conditions. The slidable collar 26 is releasably held in a relatively fixed position on the draft member 9 by any suitable means such as a leaf spring 29, the forward end of which is secured beneath two of the removable bolts 15 as best shown in Figures 2 and 3. This spring or spring finger 29 is preferably releasably and adjustably connected within the pocket 30 formed upon the collar 26 in any desirable manner.

Block 13 is provided with a pair of wing members or spaced lugs 32 which project forwardly therefrom and in vertical offset relation to the axial center line of block 13 and draft tongue 9. The lugs are provided with vertically disposed guides or faces 33 that are spaced apart and substantially parallel to each other. These guides or faces are arranged so that the hitch member is vertically swingable therebetween when operating about its pivot pin 25 during its release from the peripheral collar 26 or during the resetting of the same after it has been released. Principally, however, the arm or hitch member is disposed, under normal operating conditions, relative to the guides 33 in the manner best illustrated in Figure 4. In this position the arm is shiftable endwise between the adjacent guides for limited movement under normal draft forces and the arm is guided by said guide members 33 for movement only in the longitudinal direction of the hitch device and draft tongue 9.

The spaced lugs are further formed with stepped under-surfaces forming, first, a base or horizontal guideways 34 on the underside of each of the lugs, and secondly, a webbed extension 35 between the lugs 32 and the block 13. The extension member 35 is provided at the opposite lateral sides thereof with vertically disposed laterally spaced shoulders or fulcrum abutments 36 the purpose of which shall hereinafter be explained. The interior of the extension 35 is hollowed out to form a pocket, as at 37, to provide ample clearance for the draft bolt head 19 and the connected end of the hitch member. Moreover, as best viewed in Figure 2, the side walls 38 of the extension 35 disposed adjacent the pocket therein and the forward walls 39 are contiguous so as to constitute cam means adapted for cooperating with a cam element or connecting plate 40.

The cam element or connecting plate 40 is pivotally connected with and carried by the draw bar 8 of the tractor by means of a clevis 42 which is swingable upon a king pin 43 removably inserted through a suitable opening in the draw bar 8 as best illustrated in Figure 3. The loop of the clevis passes through an opening 44 in plate 40, this connection allowing both horizontal and vertical swinging movements of the elements relative to each other. The rearward or tongue end of plate 40 is preferably shaped to conform with the internal contour of the pedestal or base 35 or in other words to conform with the shape of the walls 38 and 39 of the pocket 37, as best shown in Figure 2. The plate is, for this purpose, provided with an extension or lug 45 which fits into the pocket 37 of the extension, said projection or lug being flanked at the opposite sides thereof with suitable shoulders or fulcrum elements 46 that are in abutting engagement with the fulcrum abutments or shoulders 36 of the pedestal 35.

The plate 40 is preferably disposed immediately beneath the horizontal guideways 34 of lugs 32 and has its rearward extension or lug also disposed to rest upon the head 19 of the draft bolt 16 as at 47 in Figure 4. The plate is held substantially in this relation by the arm or hitch member 24, the vertical leg 24b thereof passing through an opening 48 in the plate 40 and thereby completing the connection between the draft tongue 9 and the clevis of the draw bar 8 by means of the connecting element comprising the cam or plate 40.

It is apparent that the hitch device of the present construction will readily function to release a trailing vehicle from its pulling vehicle whenever excessive draft forces are imparted to the hitch device when such forces are acting directly along the line of draft between such vehicles. However, the hitch device of the present construction will act just as readily to release a trailing vehicle from its pulling vehicle whenever excessive draft forces are imparted thereto even though such forces are not acting directly along the line of draft between the vehicles.

The operation of the hitch device when subjected to excessive lateral components of an excessive rearward draft force, may best be understood with reference to Figures 1 and 2. Assume, for the sake of illustration, that the cutter bar 10 of the mower 6 strikes an obstruction. This will immediately retard the forward movement of the mower and since the cutter bar extends laterally from the mower, the resistance of the obstruction thereagainst will act to turn the mower in a clockwise direction. This turning movement will also act to bend the tongue 9 laterally since the draft force of the tractor is forwardly while the components of the resisting force upon the draft tongue 9 act both laterally and rearwardly. It is under these conditions, and under any condition wherein lateral forces or lateral components of other forces act upon the draft tongue and its device associated therewith, that those lateral forces act to frictionally bind the draft bolt of prior hitch devices within its mounting, thereby tending to prevent endwise movement of said bolt to affect a release of the hitch connection.

This undesirable and objectionable situation does not occur in the device of this invention. Any excessive lateral force acting upon the draft tongue 9 will rock or pivot the connecting plate 40 laterally in one direction or the other depending upon the direction of the force. If the mower and its draft tongue are forced to rotate in a clockwise direction as viewed in Figures 1 and 2, the connecting plate or cam 40 will be rocked or pivoted counterclockwise about a fulcrum point substantially at *a* in Figure 2. Through this action the plate is cammed or forced out of the pocket 37 in the extension 35 carrying the arm or hitch member 24 and its associated draft bolt longitudinally of the draft tongue, thereby moving the arm 24a out of engagement with the peripheral collar 26 and into its released position. The opening 48 in plate 40 is so shaped that a substantially straight forward pull will be exerted upon the draft bolt 16 and its arm 24b while the plate 40 rocks about a fulcrum point such as is indicated at *a* in Figure 2. When the draft bolt and its arm are so moved endwise of tongue 9 and relative to their associated elements that are carried by said tongue, binding is entirely eliminated between the relatively movable members of the device and a dependable release of the trailing vehicle results.

The lugs 32 on block 13 further supplement the foregoing action of plate 40 during a release under lateral forces, and act as cooperative means for adding rigidity to the elements of the hitch device by guiding the arm 24 straight forwardly, thus eliminating possible twisting of the arm about the axis of the draft bolt and to further guard against possible bending of the arm. Obviously, lugs 32 may be omitted if so desired inasmuch as the device will still be operable in the capacity for which it was devised.

Moreover, the disclosed illustrations of the releasable hitch device and the foregoing description pertaining thereto merely relate to a preferred embodiment of said device, it being understood that changes in the specific structure thereof are contemplated which will not depart from the fundamental concept of the device exemplified. Therefore, I do not intend to be limited to any specific structure for carrying out the purposes of this invention, but only insofar as the appended claims shall be so limited to the same.

What I claim is:

1. A hitch device for connecting two vehicles comprising shiftable hitch means mounted upon one of said vehicles and releasable from the other upon predetermined longitudinal movement of said means, and force transmitting means for transmitting both longitudinal and lateral draft forces to said shiftable hitch means as longitudinal forces to cause said hitch means to be stressed in tension only, irrespective of the direction of the draft force imposed upon said force transmitting means, whereby said one vehicle is disconnected from the other of said vehicles under both longitudinal and laterally acting abnormal draft forces.

2. A hitch device for connecting two vehicles comprising a releasable hitch member connected with the draft tongue of one of said vehicles and held against lateral movement relative to said tongue, cam means connecting said hitch member to the other of said vehicles and adapted for rockable engagement with a portion of said draft tongue, said cam means positively acting to release said hitch member when acted upon by excessive lateral or longitudinal draft forces to disconnect said vehicles.

3. A hitch device for connecting two vehicles comprising releasable hitch means connected with one of said vehicles, and means connected between said hitch means and the other of said vehicles, comprising a member adapted for rocking laterally about points disposed substantially adjacent the point of connection of said member with said hitch means cooperating with said hitch means to effect its own release therefrom when acted upon by excessive lateral draft forces.

4. A hitch device comprising in combination, a draft tongue, releasable hitch means associated with said tongue, connecting means pivotally connected with said hitch means and adapted for connection with a draw bar of a pulling vehicle, said connecting means having abutting engagement with said tongue and being laterally rockably relative thereto for actuating said hitch means longitudinally of said draft tongue and out of operative hitching position therewith.

5. A hitch device comprising in combination, a draft tongue, laterally spaced abutment means on said tongue, a releasable hitch member connected with said tongue, and hitch means adapted for connection with a draw bar of a pulling vehicle and connected with said hitch member, said hitch means having fulcrum means associated therewith for engaging said laterally spaced abutment means of the draft tongue whereby excessive lateral movement of said tongue acts to rock said hitch means to positively effect a release of said hitch member from its operative hitching position with respect to said draft tongue.

6. A hitch device comprising in combination, a draft tongue, hitch means connected with said draft tongue and releasable from hitching position relative thereto by excessive movement longitudinally of the tongue under overload draft forces imparted to said tongue, plate means connected with said hitch means and adapted for connection with a pulling vehicle, and cooperative means carried by said tongue and plate means whereby lateral movement of the latter actuates said hitch means longitudinally of the draft tongue and out of hitching position.

7. A hitch device comprising in combination, a tongue member, a hitch element connected with said tongue member and releasable from hitching position on excessive longitudinal movement thereof relative to said tongue member, and means connected for lateral rocking movement about points disposed on opposite sides of the axial center line of the tongue member and reacting against the tongue under abnormal lateral draft forces to positively move the hitch element longitudinally of said tongue member and out of hitching position with respect to said tongue member.

8. A hitch device for connecting two vehicles comprising a shiftable hitch member releasable upon excessive movement along the line of draft, means for guiding said hitch longitudinally along the line of draft, and means operable under excessive lateral draft forces for actuating said hitch member longitudinally of said guide means to effect the release of said hitch member from hitching position.

9. A hitch device comprising in combination, a draft tongue, a hitch member disposed in offset relation to said tongue and connected therewith, and releasable from operative hitching position by a predetermined movement thereof longitudinally of the draft tongue, means for guiding said hitch member longitudinally of said tongue to prevent twisting thereof with respect to said tongue, and means adapted for connection with a pulling vehicle and cooperating between said tongue and said hitch member to move the latter directly longitudinally of said tongue for releasing the same from hitching position under excessive lateral draft forces.

10. A hitch device for connecting two vehicles comprising, in combination, a forwardly extending draft member connected with one of said vehicles, a head carried thereby and including a pair of laterally spaced abutments, a spring biased member shiftably carried by said head and having an arm releasable upon predetermined longitudinal movement with respect to the draft member, said arm being disposed between said laterally spaced abutments, a hitch plate secured to the other vehicle and having an opening to receive said arm and laterally disposed fulcrum portions adapted to bear against said laterally spaced abutments carried by the head whereby the hitch plate, when subjected to draft forces longitudinally of the draft member, shifts said member longitudinally thereof and, when subjected to draft forces having lateral components, is adapted to rock about one of said abutments to also shift said member longitudinally.

11. A hitch device for connecting two vehicles comprising, in combination, a forwardly extending draft member connected with one of said vehicles, a head carried thereby and including a pair of laterally spaced abutments, a spring biased member shiftably carried by said head and having an arm released upon predetermined longitudinal movement with respect to the draft member, said arm being disposed between said laterally spaced abutments, a hitch plate secured to the other vehicle and having an opening to receive said arm and laterally disposed fulcrum portions adapted to bear against said laterally spaced abutments carried by the head whereby the hitch plate, when subjected to draft forces longitudinally of the draft member, shifts said member longitudinally thereof and, when subjected to draft forces having lateral components, is adapted to rock about one of said abutments to also shift said member longitudinally, and guide means carried by said head and including spaced surfaces cooperating with said hitch plate and said arm for guiding the latter in their respective movements.

12. A hitch device for connecting two vehicles comprising, in combination, a forwardly extending draft member connected with one of said vehicles, a head carried thereby and including a pair of laterally spaced abutments, a spring biased member shiftably carried by said head and having an arm released upon predetermined longitudinal movement with respect to the draft member, said arm being disposed between said laterally spaced abutments, a hitch plate secured to the other vehicle and having an opening to receive said arm and laterally disposed fulcrum portions adapted to bear against said laterally spaced abutments carried by the head whereby the hitch plate, when subjected to draft forces longitudinally of the draft member, shifts said member longitudinally thereof and, when subjected to draft forces having lateral components, is adapted to rock about one of said abutments to also shift said member longitudinally, and guide means carried by said head and including two pairs of spaced surfaces cooperating with said hitch plate and said arm for guiding the latter in their respective movements, one pair of surfaces being spaced laterally, and disposed vertically to receive the arm therebetween and the other surfaces being disposed in coplanar relationship to receive the upper surface of and guide the hitch member.

13. A releasable hitch mechanism for connecting two vehicles comprising a support, a hitch device longitudinally shiftable relative to said support, a member releasably connected to said device and releasable therefrom when the device has been shifted longitudinally to a certain position, and means on said support and said member providing for rocking movement of said member with respect to said support about either of two points on opposite sides of the point of connection of said member with said device to cause said member to shift said device and free the member therefrom upon the occurrence of said rocking movement.

14. A hitch device comprising in combination, a vehicle having a tongue member, a hitch member connected with said tongue member and releasable from hitching position under excessive longitudinal or lateral draft forces, and means for connecting said hitch member with a second vehicle, said means being detachable from said hitch member and having rocking movement about points on said tongue member eccentrically disposed with respect to the line of draft whereby said means acts under abnormal lateral draft forces to release said hitch member and to effect its own detachment from the latter.

15. A releasable hitch device for connecting two vehicles, comprising a support on one of said vehicles, releasable hitch means through which draft is transmitted from one vehicle to the other mounted upon said support and releasable by excessive longitudinal movement relative to said support, and means disposed in abutting relation with said support and releasably connected to said hitch means for transmitting longitudinal and lateral draft forces from one vehicle to said shiftable hitch means and for transforming the lateral draft forces on the releasable means into longitudinal forces on said hitch means.

16. A hitch device comprising, in combination, a draft tongue, a hitch means carried by said tongue and longitudinally shiftable with respect thereto, spring means for yieldingly resisting such movement, and means for transmitting draft forces to said draft tongue through said hitch means and having rockable engagement with said draft tongue for transforming lateral draft forces on said transmitting means into longitudinal forces on said hitch means, said transmitting means being releasably connected to said hitch means to disconnect therefrom when the resultant longitudinal forces on said hitch means exceed a certain maximum.

17. A hitch device comprising in combination, a vehicle draft tongue, a releasable hitch member adapted to be permanently connected with said tongue and adapted to be released from operative hitching position under an abnormal draft force, a second hitch member for connection with a second vehicle, and means for connecting said hitch members comprising a member laterally rockable with respect to both the tongue and the releasable hitch member whereby the latter is released from hitching position under excessive lateral or longitudinal draft forces.

18. A hitch device comprising, in combination, a draft tongue, a releasable hitch member carried thereby, retaining means also carried by said draft tongue for holding said hitch member in operative hitching position with respect to the latter under normal draft forces, and laterally rockable means for connecting said tongue with a pulling vehicle comprising a cam member having concurrent operative camming engagement with both said tongue and said hitch member to automatically draw the latter out of operative hitching engagement with said retaining means when excessive lateral draft forces are transmitted to said draft tongue.

19. A hitch device comprising, in combination, a draft tongue, a hitch means carried by said tongue and longitudinally shiftable with respect thereto, means releasably connected to said hitch means for transmitting longitudinal and lateral draft forces thereto, and cooperative means carried by said last named means and said draft tongue for transforming lateral draft forces imposed on said releasable means into longitudinal draft forces on said longitudinally shiftable hitch means.

TALBERT W. PAUL.